US011120060B2

(12) United States Patent
Boxwell et al.

(10) Patent No.: US 11,120,060 B2
(45) Date of Patent: Sep. 14, 2021

(54) EFFICIENT RESOLUTION OF SYNTACTIC PATTERNS IN QUESTION AND ANSWER (QA) PAIRS IN AN N-ARY FOCUS COGNITIVE QA SYSTEM

(71) Applicant: INTERNATIONAL BUSINESS MACHINES CORPORATION, Armonk, NY (US)

(72) Inventors: Stephen A. Boxwell, Franklin, OH (US); Keith G. Frost, Delaware, OH (US); Stanley J. Vernier, Grove City, OH (US); Kyle M. Brake, Dublin, OH (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 197 days.

(21) Appl. No.: 16/168,718

(22) Filed: Oct. 23, 2018

(65) Prior Publication Data
US 2020/0125677 A1 Apr. 23, 2020

(51) Int. Cl.
*G06F 16/33* (2019.01)
*G06F 16/332* (2019.01)

(52) U.S. Cl.
CPC ........ *G06F 16/3329* (2019.01); *G06F 16/334* (2019.01); *G06F 16/3335* (2019.01)

(58) Field of Classification Search
CPC .................................................. G06F 16/3329
USPC ....................................................... 707/735
See application file for complete search history.

(56) References Cited

U.S. PATENT DOCUMENTS

| 5,519,608 | A | 5/1996 | Kupiec | |
|---|---|---|---|---|
| 5,696,962 | A | 12/1997 | Kupiec | |
| 6,263,335 | B1 | 7/2001 | Paik et al. | |
| 2007/0282916 | A1* | 12/2007 | Albahari | G06F 16/252 |
| 2010/0318511 | A1* | 12/2010 | Phan | G06Q 10/103 |
| | | | | 707/722 |
| 2016/0179934 | A1 | 6/2016 | Stubley et al. | |
| 2016/0232221 | A1* | 8/2016 | McCloskey | G06F 16/285 |

(Continued)

OTHER PUBLICATIONS

"Answer Extraction from Passage Graph for Question Answering" Hong Sun1 , Nan Duan2, Yajuan Duan3, Ming Zhou2 1 Tianjin University, No. 92 Weijin Road, Tianjin, China kaspersky@tju.edu.cn 2 Microsoft Research Asia, No. 5 Danling Street, Beijing, China fnanduan, mingzhoug@microsoft.com 3 University of Science and Technology of China, Hefei, China dyj@mail.ustc.edu.cn 2002 ( 7 Pages).

(Continued)

*Primary Examiner* — Syling Yen
(74) *Attorney, Agent, or Firm* — Griffiths & Seaton PLLC

(57) ABSTRACT

Embodiments for processing questions based on equivalence classes in a cognitive question answering system. A plurality of syntactic representations of a plurality of questions asked of the cognitive question answering system are provided. A plurality of syntactic representations of a plurality of passages ingested by the cognitive question answering system are provided. Question focus to candidate passage pairs are mapped to form an equivalence class mapping, and the equivalence class mapping is used to determine an answer to one of the plurality of questions asked of the cognitive question answering system.

21 Claims, 10 Drawing Sheets

(56) References Cited

U.S. PATENT DOCUMENTS

2017/0169355 A1\* 6/2017 Boyer ..................... G06N 5/04

OTHER PUBLICATIONS

Greenwood, Mark & Saggion, Horacio "A Pattern Based Approach to Answering Factoid, List and Definition Questions" Conference Paper—Jan. 2004 Source DBLP Conference: Computer-Assisted Information Retrieval (Recherche d'Information et ses Applications)—RIAO 2004, 7th International Conference, University of Avignon, France, Apr. 26-28, 2004. Proceedings (12 Pages).

\* cited by examiner

EFFICIENT RESOLUTION OF SYNTACTIC PATTERNS IN QUESTION AND ANSWER (QA) PAIRS IN AN N-ARY FOCUS COGNITIVE QA SYSTEM

BACKGROUND OF THE INVENTION

Field of the Invention

The present invention relates in general to computing systems, and more particularly, to various embodiments for efficiently grouping syntactic representations of questions and passages in a cognitive Question and Answer (QA) system.

Description of the Related Art

With the increased usage of computing networks, such as the Internet, humans are currently inundated and overwhelmed with the amount of information available to them from various structured and unstructured sources. However, information gaps abound as users try to piece together what they can find that they believe to be relevant during searches for information on various subjects. To assist with such searches, recent research has been directed to generating Question and Answer (QA) systems which may take an input question, analyze it, and return results indicative of the most probable answer to the input question. QA systems provide automated mechanisms for searching through large sets of sources of content (e.g., electronic documents) and analyze them with regard to an input question to determine an answer to the question and a confidence measure as to how accurate an answer is for answering the input question.

SUMMARY OF THE INVENTION

Various embodiments for processing questions based on equivalence classes in a cognitive question answering system, by a processor, are provided. In one embodiment, a method comprises providing a plurality of syntactic representations of a plurality of questions asked of the cognitive question answering system; providing a plurality of syntactic representations of a plurality of passages ingested by the cognitive question answering system; mapping question focus to candidate passage pairs to form an equivalence class mapping; and utilizing the equivalence class mapping to determine an answer to one of the plurality of questions asked of the cognitive question answering system.

Additional system and computer program product embodiments are provided and each supply related advantages.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE DRAWINGS

Figure 1:
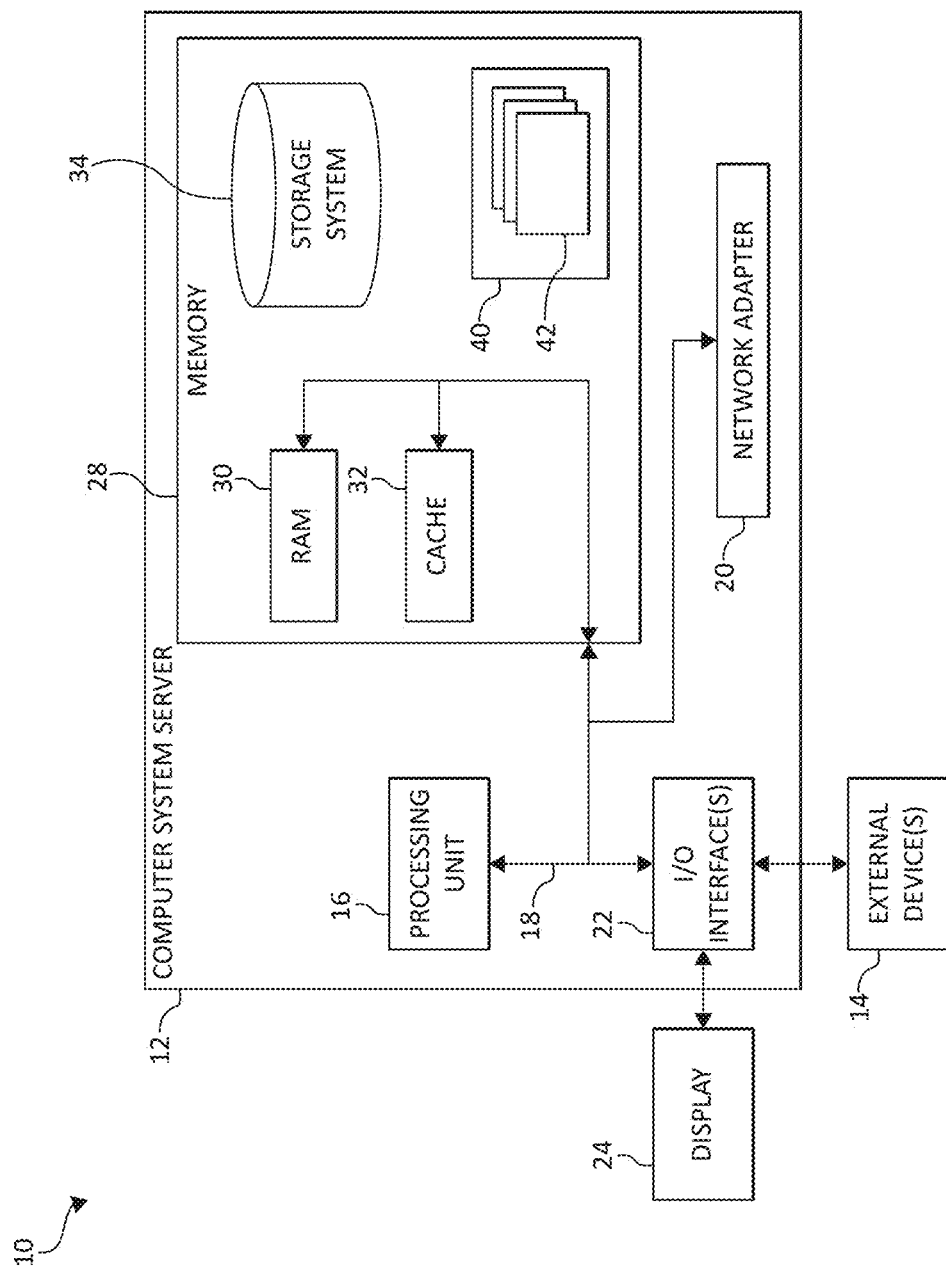
FIG. 1 is a block diagram depicting an exemplary cloud computing node, according to an embodiment of the present invention.

As aforementioned, QA systems provide automated mechanisms for searching through large sets of sources of content (e.g., electronic documents) and analyze them with regard to an input question to determine an answer to the question and a confidence measure as to how accurate an answer is for answering the input question.

One such QA system is the Watson™ system available from International Business Machines (IBM) Corporation of Armonk, N.Y. The Watson™ system is an application of advanced natural language processing, information retrieval, knowledge representation and reasoning, and machine learning technologies to the field of open domain question answering. The Watson™ system is built on IBM's DeepQA™ technology used for hypothesis generation, massive evidence gathering, analysis, and scoring. DeepQA™ takes an input question, analyzes it, decomposes the question into constituent parts, generates one or more hypothesis based on the decomposed question and results of a primary search of answer sources, performs hypothesis and evidence scoring based on a retrieval of evidence from evidence sources, performs synthesis of the one or more hypothesis, and based on trained models, performs a final merging and ranking to output an answer to the input question along with a confidence measure.

QA systems, such as IBM's Watson™ QA system, require a significant amount of compute power to analyze a natural language question and determine the results from candidate findings. The identified candidate findings, as well as the other information from which the candidate findings are identified, may be obtained from static information sources (i.e. information sources that exhibit permanence) such as encyclopedias, books, journals, magazine articles, older web pages, or the like, as well as real-time information sources (i.e. information sources that exhibit impermanence) such as blogs, personal experiences, expert opinions, new web pages, or the like. The amount of compute power (and therefore compute time) can become increasingly prohibitive according to the natural language input of the question. Inherently, humans ask questions or utter passages in different semantic variances notwithstanding the intent (or focus) of the question or statement in selected cases are similar or equivalent. Often times these questions or passages have conversational gaps or are uttered such that the QA system must close these gaps to identify the focus of the question to hence determine the appropriate answer thereto.

Therefore, in a QA system, it is advantageous to identify gappy "equivalence sets" of syntactic relations to match equivalent questions and passages. For example, given the question "What is the capital of Germany?" and the passage "Berlin is Germany's capital", it would be reduce computational power and time of the QA system to anticipate that the two syntactic structures (X←be→capital→of→Y and Y←be→capital→X) are semantically equivalent, and thus comprise an equivalent set. A baseline method of identifying these patterns is to assign a name to each equivalence class having various equivalence sets therein, identify which equivalence classes appear in the question, identify which equivalence classes appear in the passage, and attempt to unify the gaps in the question and passage. Performing this type of operation will ultimately achieve the desired result, however is unacceptably slow and computationally intensive for determining a large numbers of patterns.

Accordingly, the present invention provides novel mechanisms for, given a set of gappy syntactic equivalence classes, efficiently matching questions to passages containing candidate answers. It is assumed that the user of a logical form pattern matching service is likely to make queries according to certain patterns, including multiple queries using the same question, and multiple queries using the same passage (but rather having different candidate answers from that passage). By grouping these queries together, repeated work and unnecessarily expended compute power may be avoided by taking advantage of similarities across multiple queries.

The illustrative embodiments may be utilized in many different types of data processing environments. FIGS. 1-4 are directed to describing an example Question/Answer, Question and Answer, or Question Answering (QA) system, methodology and architecture in which the illustrative embodiments may be implemented. As will be discussed in greater detail hereafter, the illustrative embodiments may be integrated in, and may augment and extend the functionality of, these QA mechanisms with regard to analyzing natural language questions to determine missing information in order to improve accuracy of answers.

Thus, it is important to first have an understanding of how question and answer creation in a QA system may be implemented before describing how the mechanisms of the illustrative embodiments are integrated in and augment such QA systems. It should be appreciated that the QA mechanisms described herein are only examples and are not intended to state or imply any limitation with regard to the type of QA mechanisms with which the illustrative embodiments may be implemented. Many modifications to the example QA system may be implemented in various embodiments of the present invention without departing from the spirit and scope of the present invention.

QA mechanisms operate by accessing information from a corpus of data or information (also referred to as a corpus of content), analyzing it, and then generating answer results based on the analysis of this data. Accessing information from a corpus of data typically includes: a database query that answers questions about what is in a collection of structured records, and a search that delivers a collection of content links in response to a query against a collection of unstructured data (text, markup language, etc.). Conventional question answering systems are capable of generating answers based on the corpus of data and the input question, verifying answers to a collection of questions for the corpus of data, correcting errors in digital text using a corpus of data, and selecting answers to questions from a pool of potential answers (i.e. candidate answers or passages).

Content creators, such as article authors, electronic document creators, web page authors, document database creators, and the like, may determine use cases for products, solutions, and services described in such content before writing their content. Consequently, the content creators may know what questions the content is intended to answer in a particular topic addressed by the content. Categorizing the questions, such as in terms of roles, type of information, tasks, or the like, associated with the question, in each document of a corpus of data may allow the QA system to more quickly and efficiently identify documents containing content related to a specific query. The content may also answer other questions that the content creator did not contemplate that may be useful to content users. The questions and answers may be verified by the content creator to be contained in the content for a given document. These capabilities contribute to improved accuracy, system performance, machine learning, and confidence of the QA system. Content creators, automated tools, or the like, may annotate or otherwise generate metadata for providing information useable by the QA system to identify this question and answer attributes of the content.

Operating on such content, the QA system generates answers for input questions using a plurality of intensive analysis mechanisms which evaluate the content to identify the most probable answers (i.e. candidate answers) for the input question. The illustrative embodiments leverage the work already done by the QA system to reduce the computation time and resource cost for subsequent processing of questions that are similar to questions and passages/answers already processed by the QA system.

It should be noted as described herein, the term "cognitive" (or "cognition") may be relating to, being, or involving conscious intellectual activity such as, for example, thinking, reasoning, or remembering, that may be performed using a machine learning. In an additional aspect, cognitive or "cognition may be the mental process of knowing, including aspects such as awareness, perception, reasoning and judgment. A machine learning system may use artificial reasoning to interpret data from one or more data sources (e.g., sensor-based devices or other computing systems) and learn topics, concepts, and/or processes that may be determined and/or derived by machine learning.

In an additional aspect, cognitive or "cognition" may refer to a mental action or process of acquiring knowledge and understanding through thought, experience, and one or more senses using machine learning (which may include using sensor-based devices or other computing systems that include audio or video devices). Cognition may also refer to identifying patterns of behavior, leading to a "learning" of one or more events, operations, or processes. Thus, the cognitive model may, over time, develop semantic labels to apply to observed behavior and use a knowledge domain or ontology to store the learned observed behavior. In one embodiment, the disclosed system provides for progressive levels of complexity in what may be learned from the one or more events, operations, or processes.

In additional aspect, the term cognitive may refer to a cognitive system. The cognitive system may be a specialized computer system, or set of computer systems, configured with hardware and/or software logic (in combination with hardware logic upon which the software executes) to emulate human cognitive functions. These cognitive systems apply human-like characteristics to convey and manipulate ideas which, when combined with the inherent strengths of digital computing, can solve problems with a high degree of accuracy (e.g., within a defined percentage range or above an accuracy threshold) and resilience on a large scale. A cognitive system may perform one or more computer-implemented cognitive operations that approximate a human thought process while enabling a user or a computing system to interact in a more natural manner. A cognitive system may comprise artificial intelligence logic, such as natural language processing (NLP) based logic, for example, and machine learning logic, which may be provided as specialized hardware, software executed on hardware, or any combination of specialized hardware and software executed on hardware. The logic of the cognitive system may implement the cognitive operation(s), examples of which include, but are not limited to, question answering, identification of related concepts within different portions of content in a corpus, and intelligent search algorithms, such as Internet web page searches.

In general, such cognitive systems are able to perform the following functions: 1) Navigate the complexities of human language and understanding; 2) Ingest and process vast amounts of structured and unstructured data; 3) Generate and evaluate hypotheses; 4) Weigh and evaluate responses that are based only on relevant evidence; 5) Provide situation-specific advice, insights, estimations, determinations, evaluations, calculations, and guidance; 6) Improve knowledge and learn with each iteration and interaction through machine learning processes; 7) Enable decision making at the point of impact (contextual guidance); 8) Scale in proportion to a task, process, or operation; 9) Extend and magnify human expertise and cognition; 10) Identify resonating, human-like attributes and traits from natural language; 11) Deduce various language specific or agnostic attributes from natural language; 12) Memorize and recall relevant data points (images, text, voice) (e.g., a high degree of relevant recollection from data points (images, text, voice) (memorization and recall)); and/or 13) Predict and sense with situational awareness operations that mimic human cognition based on experiences.

It is further understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities, but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples include, but are not limited to: microcode, device drivers, redundant processing units, external disk drive arrays, RAID systems, tape drives, and data archival storage systems, etc.

Figure 2:
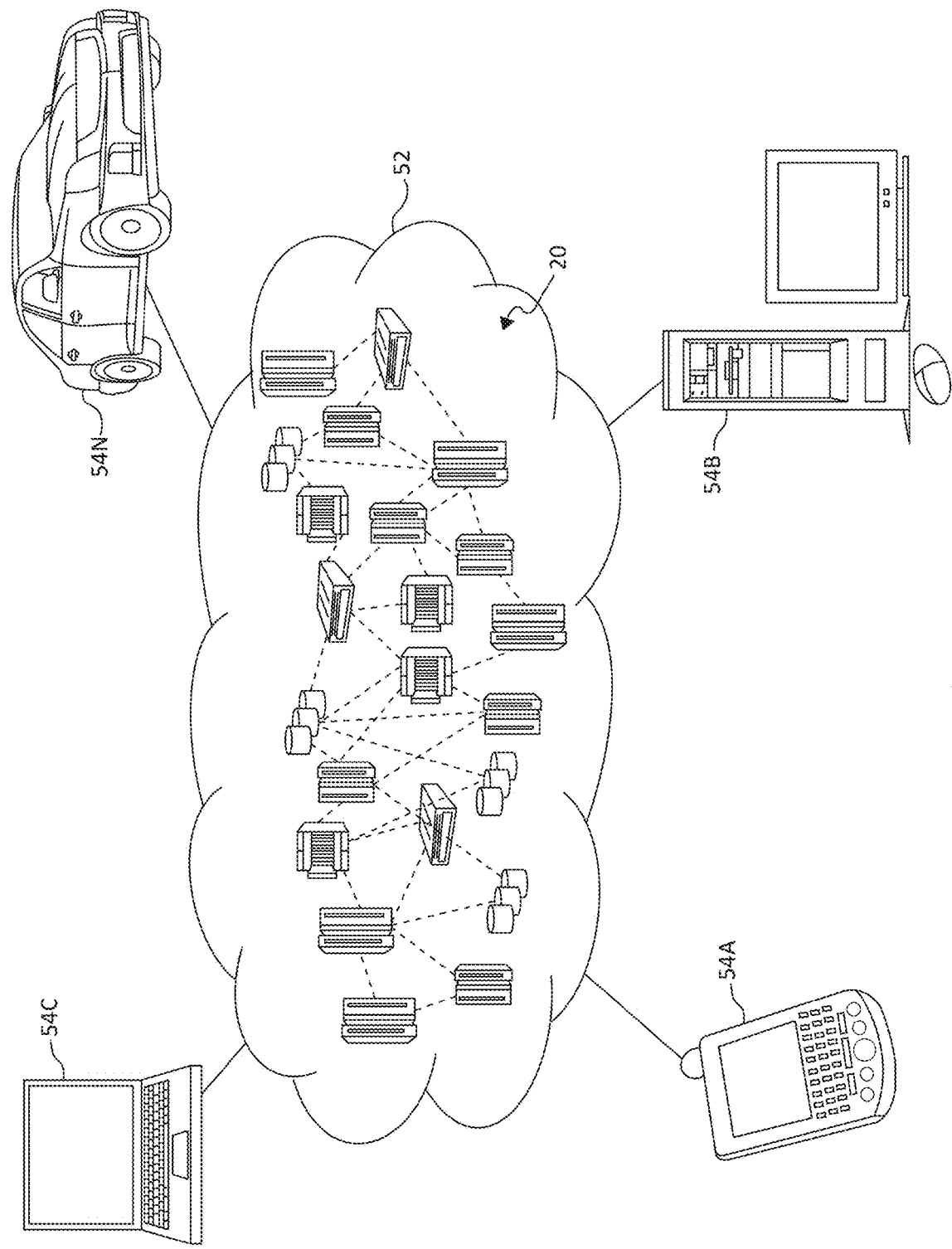
FIG. 2 is a block diagram depicting an exemplary cloud computing environment, according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
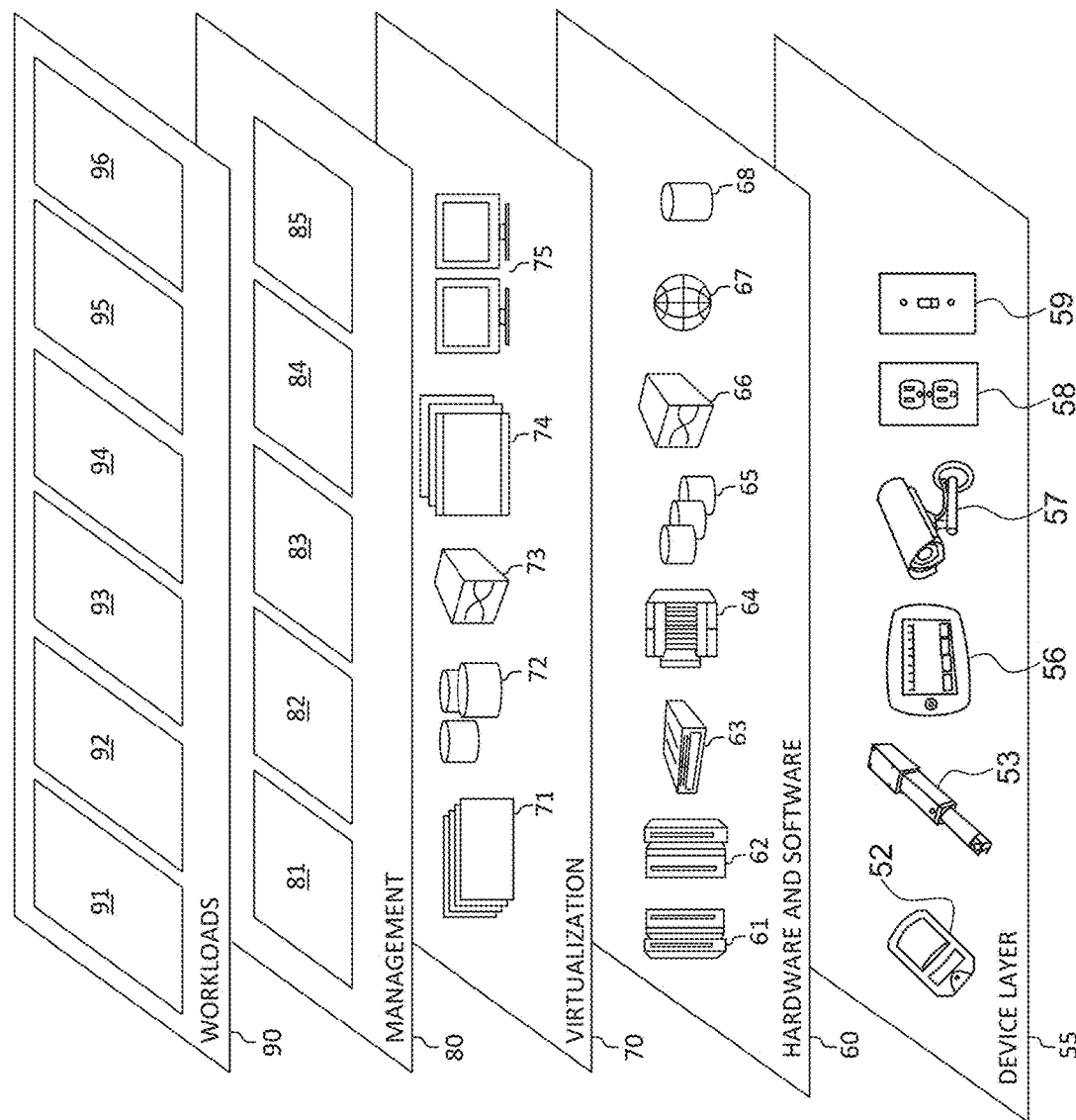
FIG. 3 is a block diagram depicting abstraction model layers, according to an embodiment of the present invention.

Referring now to FIG. 3, a set of functional abstraction layers provided by cloud computing environment 50 (FIG.

2) is shown. It should be understood in advance that the components, layers, and functions shown in FIG. 3 are intended to be illustrative only and embodiments of the invention are not limited thereto. As depicted, the following layers and corresponding functions are provided:

Device layer 55 includes physical and/or virtual devices, embedded with and/or standalone electronics, sensors, actuators, and other objects to perform various tasks in a cloud computing environment 50. Each of the devices in the device layer 55 incorporates networking capability to other functional abstraction layers such that information obtained from the devices may be provided thereto, and/or information from the other abstraction layers may be provided to the devices. In one embodiment, the various devices inclusive of the device layer 55 may incorporate a network of entities collectively known as the "internet of things" (IoT). Such a network of entities allows for intercommunication, collection, and dissemination of data to accomplish a great variety of purposes, as one of ordinary skill in the art will appreciate.

Device layer 55 as shown includes sensor 52, actuator 53, "learning" thermostat 56 with integrated processing, sensor, and networking electronics, camera 57, controllable household outlet/receptacle 58, and controllable electrical switch 59 as shown. Other possible devices may include, but are not limited to various additional sensor devices, networking devices, electronics devices (such as a remote-control device), additional actuator devices, so called "smart" appliances such as a refrigerator or washer/dryer, and a wide variety of other possible interconnected objects.

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provides cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and, in the context of the illustrated embodiments of the present invention, various QA analytical functions 96. In addition, QA analytical functions 96 may include such operations as data analysis, machine learning (e.g., artificial intelligence, natural language processing, etc.), and user analysis as will be further described. One of ordinary skill in the art will appreciate that the media content characteristic adjustment functions 96 may also work in conjunction with other portions of the various abstractions layers, such as those in hardware and software 60, virtualization 70, management 80, and other workloads 90 (such as data analytics processing 94, for example) to accomplish the various purposes of the illustrated embodiments of the present invention.

Figure 4:
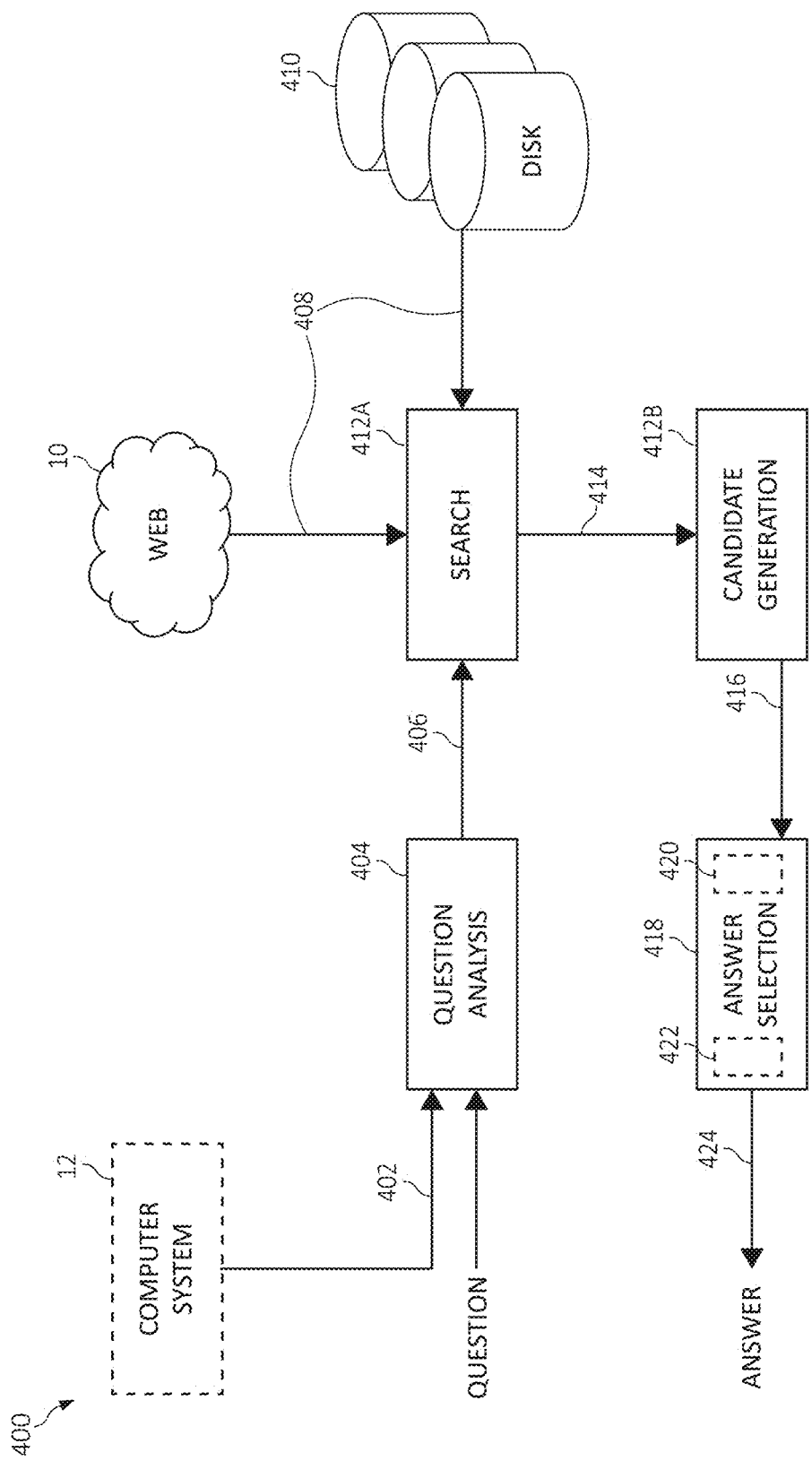
FIG. 4 is a block diagram depicting an exemplary cognitive QA system, according to an embodiment of the present invention.

Turning now to FIG. 4, block diagram depicting a high-level logical architecture 400 of an exemplary cognitive QA system, according to various mechanisms of the illustrated embodiments, is shown. As shown, the various functionality, or "modules" of functionality, hardware devices, and/or other components in the same descriptive sense as has been previously described in FIGS. 1-3 may be included in FIG. 4. For example, processing unit 12 and memory 28 of FIG. 1 may be employed in FIG. 4 to perform various computational, data processing, storage and other functionality in accordance with various aspects of the present invention.

In the high-level logical architecture 400 depicted, a question analysis component 404 receives a natural language question 402 (e.g., "Who is the $42^{nd}$ president of the United States?") from a user, and analyzes the question to produce, minimally, the semantic type of the expected answer 406 (in this example, "president"), and optionally other analysis results for downstream processing. The term "user" may refer to a person or persons interacting with the system, or may refer to the computer system 12 generating a query by mechanical means, and where the term "user query" refers to such a mechanically generated query and context 402'.

A search component 412a formulates queries from the output 406 of question analysis and consults various resources such as the World Wide Web/cloud computing nodes 10 or one or more knowledge resources (e.g., databases, knowledge bases 410) to retrieve "documents" including whole documents or document portions 408, webpages, database tuples, etc., having "passages" that are relevant to answering the question. In one aspect, the candidate answer generation module 412b implements a search for candidate answers by traversing structured, semi structured and unstructured sources contained in primary sources (e.g., the Web/cloud computing nodes 10, a data corpus in knowledge bases 410, etc.) and in an answer source knowledge base (e.g., containing collections of relations and lists extracted from primary sources). All the sources of information can be locally stored or distributed over a network, including the Internet.

The candidate generation module 412b of architecture 400 generates a plurality of output data structures containing candidate answers based upon the analysis of retrieved data. The candidate answer generation component 412b may then extract from the search results 414 potential (candidate) answers 416 to the question, which are then scored and ranked by the answer selection component 418 to produce a final ranked list of answers with associated confidence scores.

The answer selection component 418 may include an evidence gathering module that further interfaces with the primary sources and/or knowledge base for concurrently analyzing the evidence based on passages having candidate answers, and scores each of candidate answers, in one embodiment, as parallel processing operations. When the search system 412a is employed in the context of a QA system 400, the evidence gathering and answering module 418 comprises a candidate answer scoring module 420 for analyzing a retrieved passage and scoring each of candidate answers of a retrieved passage. One knowledge base includes an answer source knowledge base which may comprise one or more databases of structured or semi-structured sources (pre-computed or otherwise) comprising collections of relations (e.g., typed lists). In an example implementation, the answer source knowledge base may comprise a database stored in a memory storage system (e.g., a hard drive).

An answer ranking module 422 may be invoked to provide functionality for ranking candidate answers and determining a response 424 returned to a user via a user's computer display interface (not shown) or a computer system 12, where the response may be an answer, or an elaboration of a prior answer or request for clarification in response to a question—when a high quality answer to the question is not found. A machine learning implementation is further provided where the "answer ranking" module 422 includes a trained model component (not shown) produced using a machine learning techniques from prior data.

Figure 5:
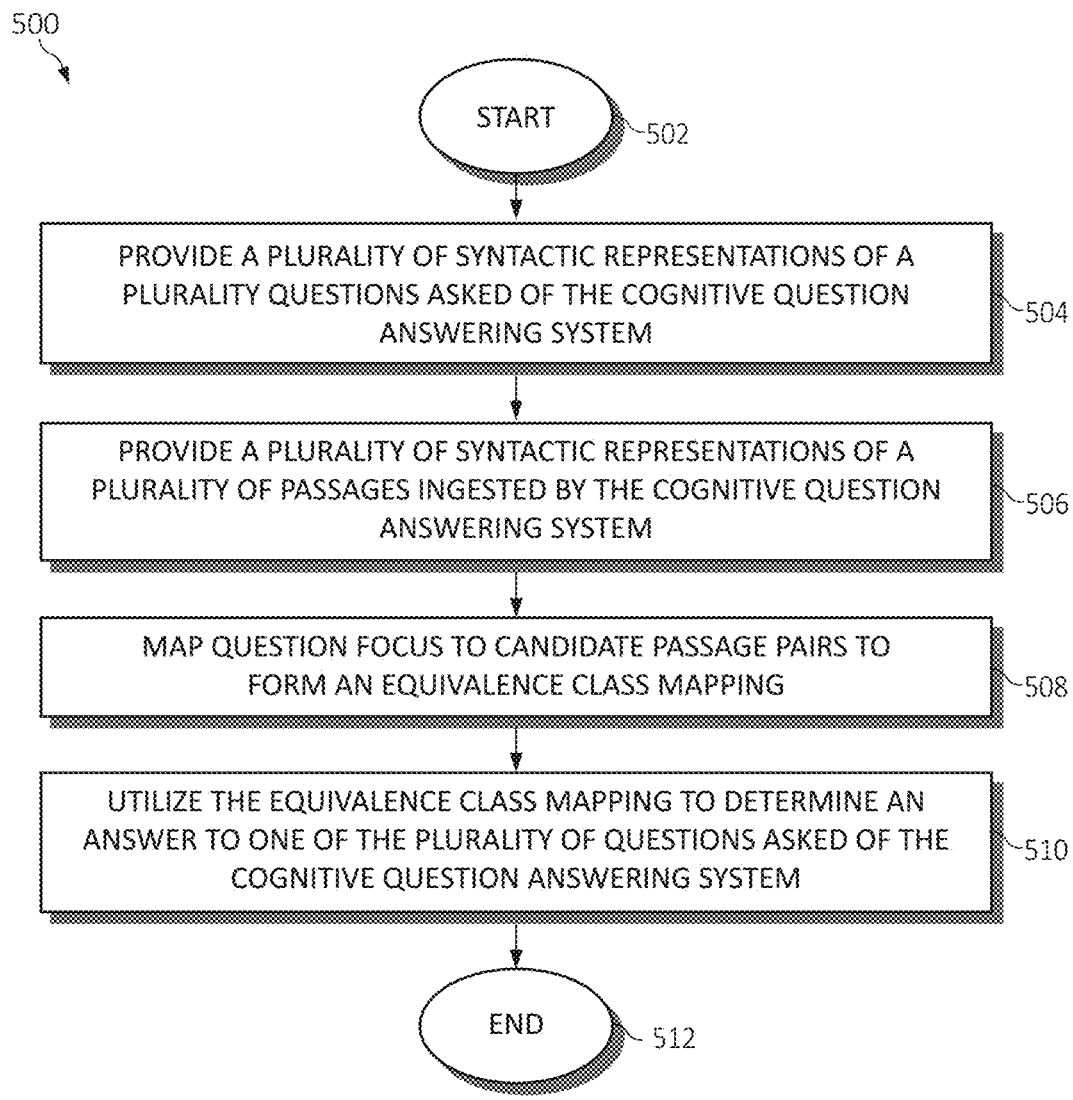
FIG. 5 is a flowchart diagram depicting an exemplary method for processing questions based on equivalence classes in a cognitive QA system, according to an embodiment of the present invention.

Turning now to FIG. 5, a flowchart diagram of an exemplary method 500 for processing questions based on equivalence classes in a cognitive QA system is illustrated. The method 500 (and any subsequent methods) may be performed in accordance with the present invention in any of the environments depicted in FIGS. 1-4, among others, in various embodiments. Of course, more or less operations than those specifically described in FIG. 5 may be included in method 500, as would be understood by one of skill in the art upon reading the present descriptions.

Each of the steps of the method 500 (and any subsequent methods) may be performed by any suitable component of the operating environment. For example, in various embodiments, the method 500 may be partially or entirely performed by a processor, or some other device having one or more processors therein. The processor, e.g., processing circuit(s), chip(s), and/or module(s) implemented in hardware and/or software, and preferably having at least one hardware component may be utilized in any device to perform one or more steps of the method 500. Illustrative processors include, but are not limited to, a CPU, an application specific integrated circuit (ASIC), a field programmable gate array (FPGA), etc., combinations thereof, or any other suitable computing device known in the art.

The method 500 begins (step 502) by providing a plurality of syntactic representations of a plurality of questions asked of the cognitive question answering system. A plurality of syntactic representations of a plurality of passages ingested by the cognitive question answering system are then provided (step 504). Question focus to candidate passage pairs are mapped to form an equivalence class mapping (step 506), and the equivalence class mapping is used to determine an answer to one of the plurality of questions asked of the cognitive question answering system (step 508). The equivalence class mapping therefore maps sets of labeled equivalence sets of questions and passages to one another by grouping so as to develop a pattern recognition of gappy questions/passages to facilitate determining one or more candidate answers by the QA system. The method 500 ends (step 510).Ref First, a "query" is defined in three portions. In a first portion, the query is defined as a syntactic representation of a question input to the QA system by the user/computer. In a second portion, the query is defined as a syntactic representation of a passage (i.e., a candidate answer to the question). Finally, in a third portion, the query is defined as a map M representing focus/candidate pairs. The question focus is the word (or words) in the question that could be replaced with the correct answer to form an accurate declarative statement. For example, in the question "Who is Jane Doe", if Jane Doe happened to be a top executive of a large software company, "who" may be replaced with "The CEO of Initech" to form "The CEO of Initech is Jane Doe". The map M representing these focus/candidate passage pairs may be constructed using any mapping technique known or developed in the art, however in a traditional factoid (one focus) QA system, this generally comprises a singleton map. In this instance, returning to the example, the Map M would then comprise a singleton map for a particular candidate {"Who"→"The CEO of Initech"}. Given a multi-focus question, such as "What women are the heads of what software companies?", there would be two foci ("What women" and "What software companies"), and the Map M for a particular candidate pair would be {"What women"→"Jane Doe", "What software companies"→"Initech"} (a map of size 2).

Figure 6A:
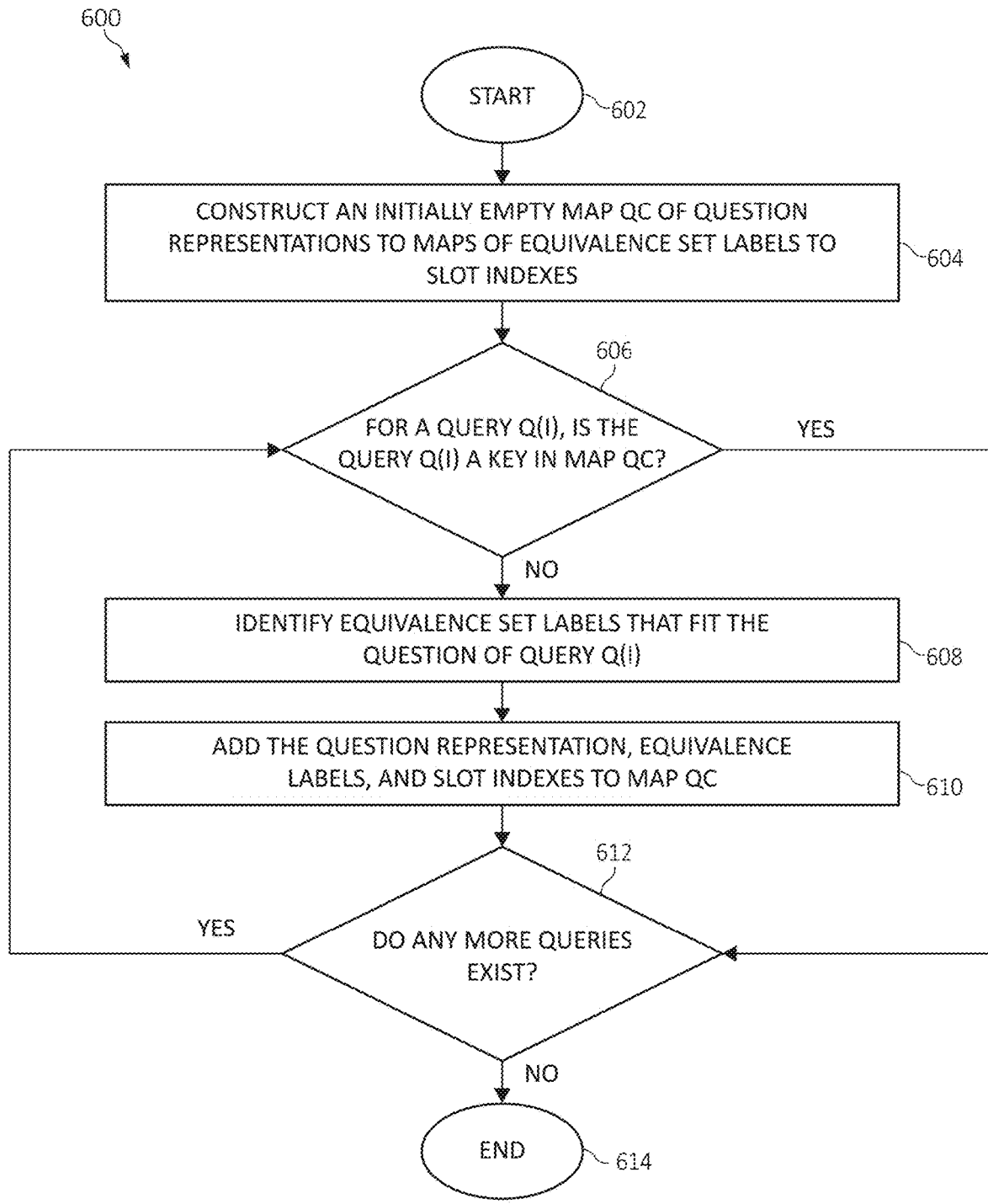
FIGS. 6A-6C are flowchart diagrams depicting exemplary methods for constructing syntactic mappings for processing questions based on equivalence classes in a cognitive QA system, according to an embodiment of the present invention.
Figure 6B:
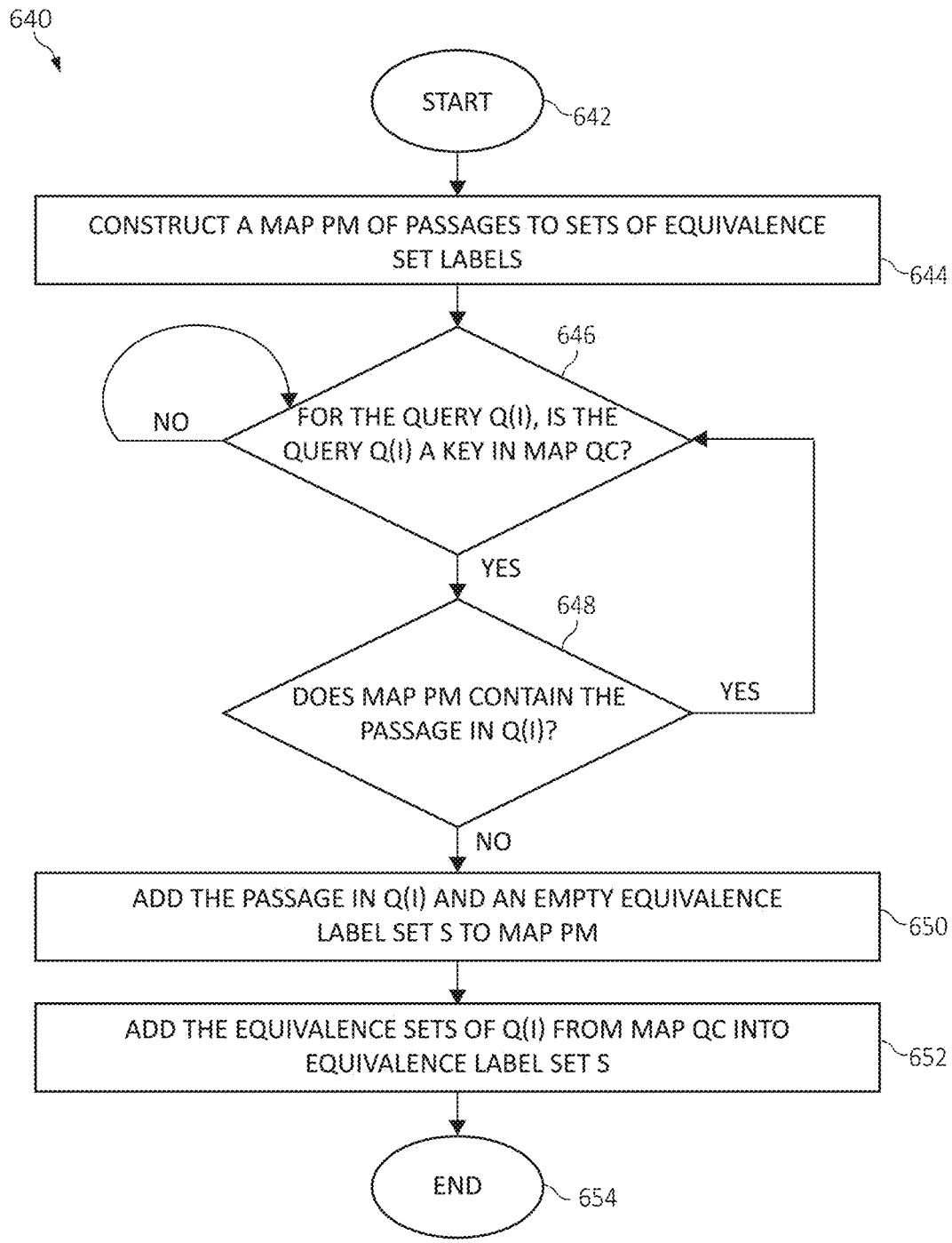
Figure 6C:
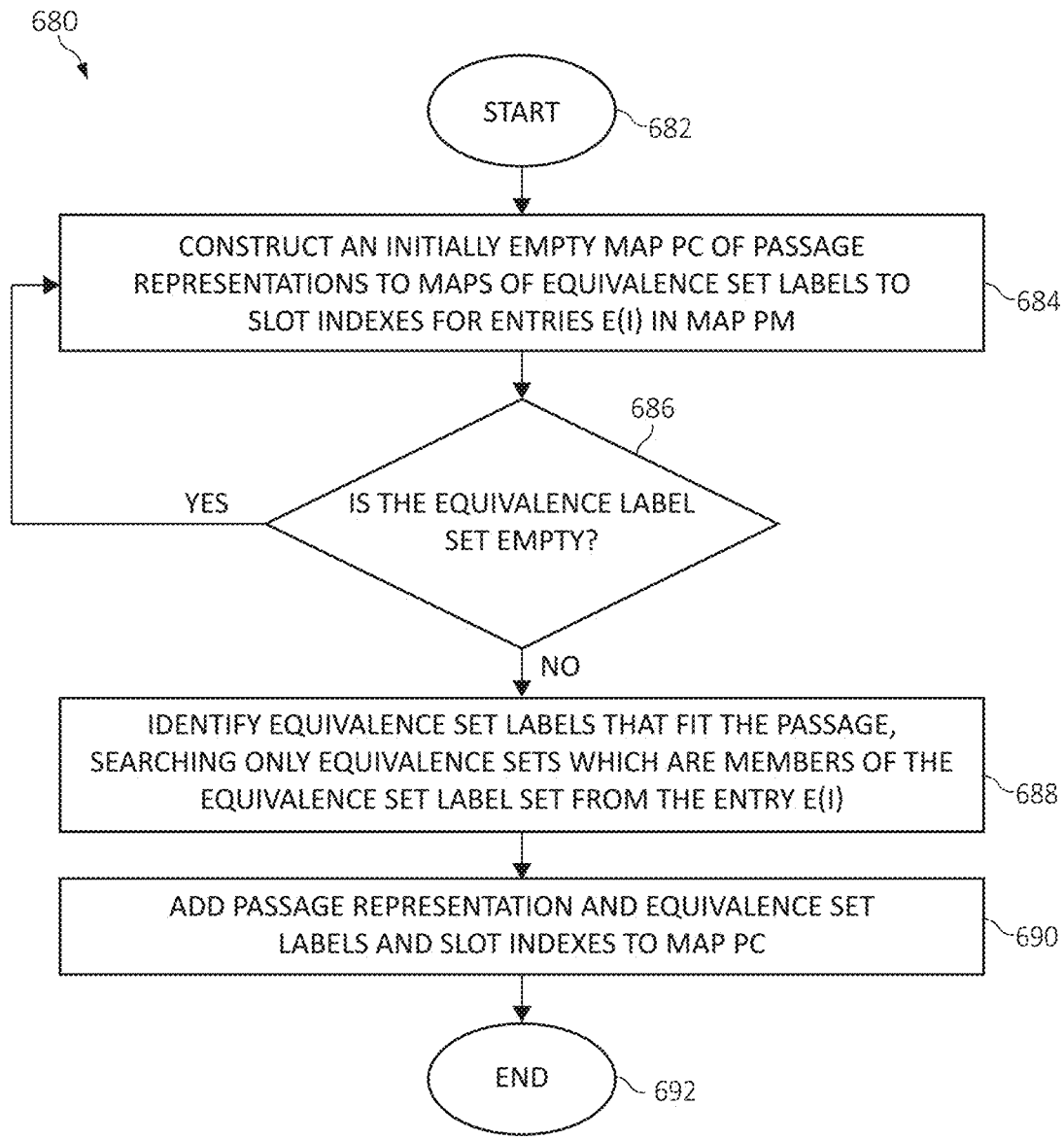

Continuing, FIGS. 6A-6C are flowchart diagrams depicting exemplary methods 600, 640, and 680, respectively, for constructing syntactic mappings for processing questions based on equivalence classes in the cognitive QA system. Referring now to method 600 of FIG. 6A, the method begins (step 602) by constructing an initially empty map QC of question representations to maps of equivalence set labels to slot indexes of map QC (step 604). At step 606, a determination is made as to, for (each) input query q(i), whether the query q(i) is a key in the map QC. If the query q(i) is a key in the map QC, the method 600 advances to determine whether any additional queries q exist at step 612. If no additional queries q exist at step 612, the method 600 ends (step 614). Otherwise, if additional queries q exist at step 612, the method 600 returns to step 606 to determine whether the next query is a key in map QC.

Returning to step 606, if the query q(i) is not a key in map QC, equivalence set labels which fit the question of query q(i) are identified (step 608), and the question representation and equivalence set labels and slot indexes thereof are added to the map QC (step 610). The method 600 then advances to determine whether any additional queries q exist at step 612. Again, if no additional queries q exist at step 612, the method 600 ends (step 614). Otherwise, if additional queries q exist at step 612, the method 600 returns to step 606 to determine whether the next query is a key in map QC.

Referring now to the method 640 of FIG. 6B, the method 640 begins (step 642) by constructing a map PM of passages to sets of equivalence set labels (step 644). For (each) input query q, the following actions are performed. First, a determination is made at step 646 as to whether the question in the query q(i) is a key in the map QC of FIG. 6A. If the question in the query q(i) is not a key in the map QC at step 646, the method 640 returns to itself at step 646 to move on to the next question of query q. Otherwise, if the question in query q(i) is a key in the map QC, another determination is made at step 648 as to whether the map PM contains the passage in query q(i). If, at step 648, the map PM contains the passage in query q(i), the method 640 returns to step 646 to move on to the next passage. Otherwise, at step 648, if the map PM does not contain the passage in query q(i), the passage in query q(i) and an initially empty set of equivalence set labels s is added to the map PM (step 650). Each of the equivalence sets of query q(i) (from the map QC) are then added into the initially empty set of equivalence set labels s (step 652). The method 640 ends (step 654).

Referring now to the method 680 of FIG. 6C, the method 680 begins (step 682) by constructing an initially empty map PC of passage representations to maps of equivalence set labels to slot indexes for each of a plurality of entries e (where each entry consists of a passage and an equivalence set label set) in map PM (step 684). A determination is made as to whether the equivalence set label set is empty at step 686. If the equivalence set label set is empty, the method returns to step 684 to retrieve additional equivalence set label sets for entries e. Otherwise, at step 686, if the equivalence set label set is not empty, the equivalence set labels that fit the passage are identified, where only the equivalence sets that are members of the equivalence set label set from the entry e are searched (step 688). The passage representation and the equivalence set labels and slot indexes are then added to the map PC (step 690) and the method 680 ends (step 692).

Figure 7A:
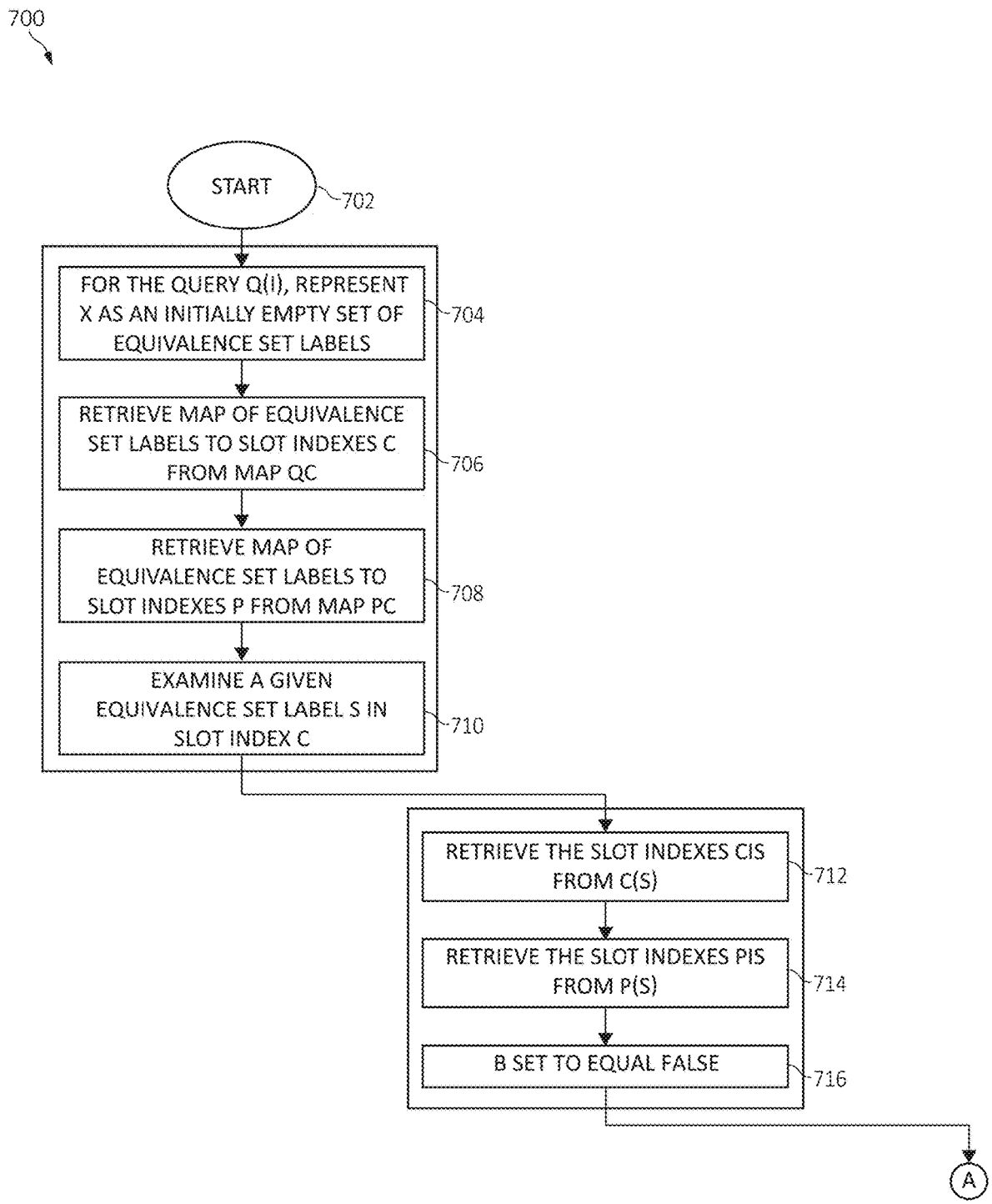
FIGS. 7A-7B are flowchart diagrams depicting an exemplary method for utilizing the syntactic mappings for processing questions based on equivalence classes in a cognitive QA system, according to an embodiment of the present invention.
Figure 7B:
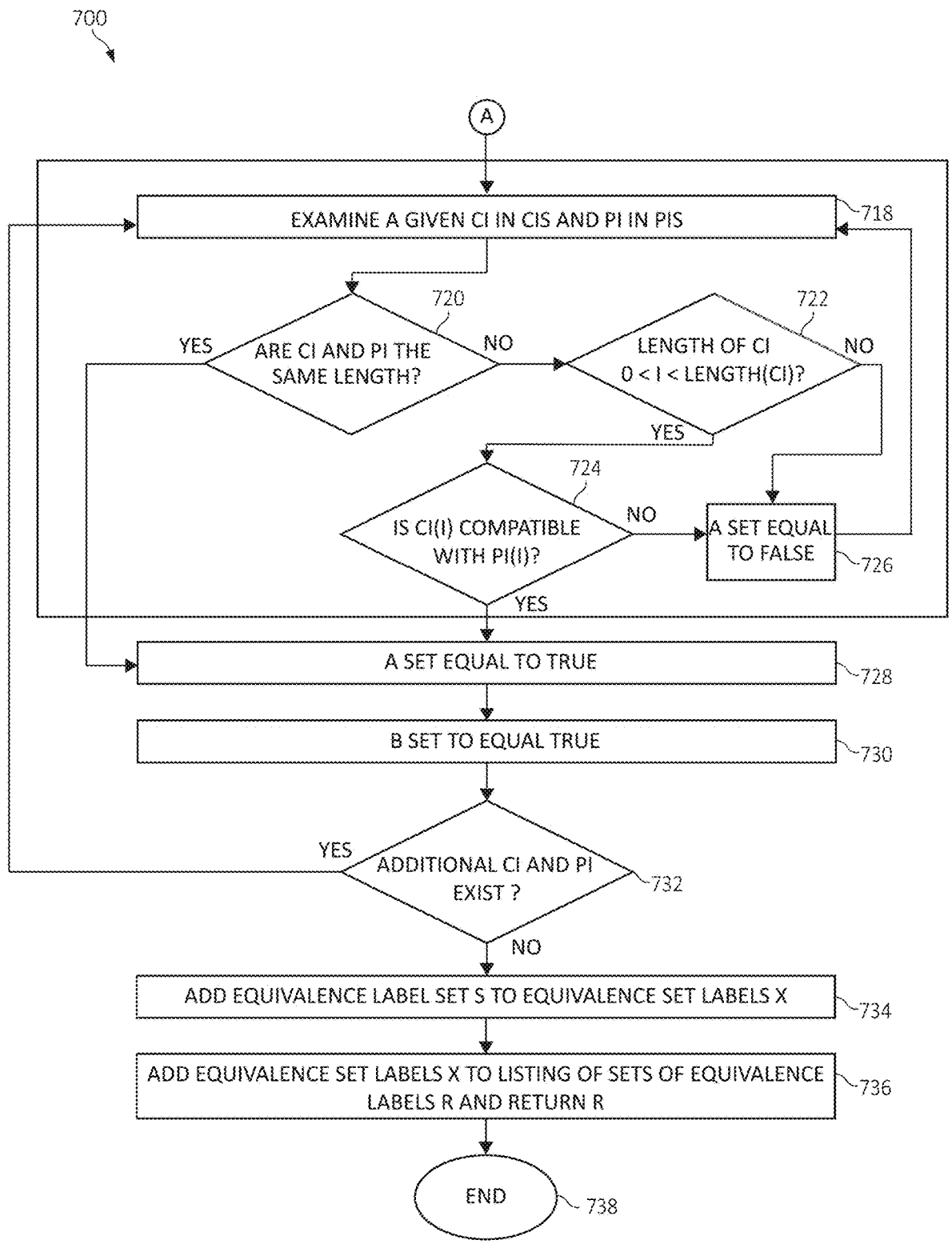

Advancing, FIGS. 7A-7B are flowchart diagrams depicting an exemplary method 700 for utilizing the syntactic mappings for processing questions based on equivalence classes in the cognitive QA system. As an initial matter, it is noted that the method 700 describes pseudocode used to perform a syntactic grouping operation wherein an association is formed between the mappings described in 6A-6C to return candidate answers/passages to input queries (questions). It is further defined that R comprises a list of the sets of equivalence set labels. The method 700 begins (step 702) by performing each of the following actions for each input query q in Q. For (each) input query q(i), x is represented as an initially empty set of equivalence set labels (step 704). The map of equivalence set labels is retrieved to slot indexes c from the map QC (step 706). The map of equivalence set labels is retrieved to slot indexes p from the map PC (step 708). Continuing, for each equivalence set label s in slot index c the following actions are performed. A given equivalence set label s is examined in slot index c (step 710). For the given equivalence set label s in slot index c, the slot indexes cis are retrieved from c(s) (step 712) and the slot indexes pis are retrieved from p(s) (step 714). A variable (bit) b is set to equal false (step 716).

Next, a given ci in cis and pi in pis is examined (step 718), and the following operations are performed. For each ci in cis and for each p in pis, a determination is made at step 720 as to whether ci and pi are the same character length. If ci and pi are the same character length at step 720, a variable (bit) a is set to equal true (step 728). Returning to step 720, if it is determined that ci and pi are not the same character length, another determination is performed at step 722 as to the length of ci is greater than i which is greater than zero (0<i<length(ci)). If, at step 722, the length of ci is not greater than i and/or i is not greater than zero, the variable a is set to equal false (step 726), and another ci and pi are examined at step 718. If, however, at step 722, the length of ci is 0<i<length(ci), a next determination is made at step 724 as to whether ci(i) is syntactically compatible or incompatible with pi(i) (i.e., whether ci(i) and pi(i) "match", or rather, given the two graphs, whether one graph fits inside the other). If, at step 724, ci(i) is syntactically incompatible with pi(i), the variable a is set to equal false (step 726) and the method 700 returns to step 718. Otherwise, at step 724, if ci(i) is syntactically compatible with pi(i), the variable a is set to equal true (step 728). Subsequently, if the variable a is true, the variable b is set to equal true (step 730). A determination is then made at step 732 whether all ci in cis and pi in pis have been examined. If additional ci in cis and pi in pis exist to be examined, the method returns to step 718 for the next query. If no additional ci in cis and pi in pis exist to be examined at step 732, the equivalence label set s is added to the equivalence set labels x (step 734), the equivalence set labels x are added to the listing of sets of equivalence set labels r, and the list of sets of equivalence set labels r is returned to the user (step 736). The method 700 then ends (step 738).

Accordingly, the present invention uses an equivalent class mapping, using the methods described previously, to map syntactic representations of input queries (questions) to syntactic representations of candidate answers according to the focus/passage of the query.

In some embodiments, when forming the equivalence class mapping, each of the plurality of questions is mapped to a given set of the plurality of passages according to the syntactic representations.

In some embodiments, a first map is constructed of the syntactic representations of the plurality of questions to equivalence set labels and slot indexes of the first map; wherein for an input query: the equivalence set labels are identified that fit a given one of the plurality of questions of the input query; and the given syntactic representation for the given one of the plurality of questions, the identified equivalence set labels of the given one of the plurality of questions, and the slot indexes are added to the first map.

In some embodiments, a second map is constructed of the syntactic representations of the plurality of passages to sets of the equivalence set labels; wherein for the input query: a given one of the plurality of passages and an initially empty equivalence label set are added to the second map; and each of the sets of equivalence set labels for the input query from the first map are added into the initially empty equivalence label set in the second map.

In some embodiments, a third map is constructed of the syntactic representations of the plurality of passages to the equivalence set labels and the slot indexes for each entry of the second map, each entry comprising the given one of the plurality of passages and a given set of the equivalence set labels; wherein for each entry: the equivalence set labels are identified that fit a given one of the plurality of passages; wherein only the equivalence set labels within the given set of the equivalence set labels within the given set of the equivalence set label are searched to perform the identification; and the identified equivalence set labels of the given one of the plurality of passages and the slot indexes are added to the third map.

In some embodiments, for each input query, an association is formed between the first, second, and third maps and performing a syntactic grouping operation commensurate with the association to determine the answer to the one of the plurality of questions.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The invention claimed is:

1. A method for processing questions based on equivalence classes in a cognitive question answering system, by a processor, comprising:
    providing a plurality of syntactic representations of a plurality of questions asked of the cognitive question answering system;
    providing a plurality of syntactic representations of a plurality of passages ingested by the cognitive question answering system;
    mapping question focus to candidate passage pairs to form an equivalence class mapping, wherein, when forming the equivalence class mapping, those of the plurality of questions historically asked of the cognitive question answering system having a semantically equivalent question focus are mapped to semantically equivalent ones of the candidate passage pairs notwithstanding the equivalent ones of the candidate passage pairs are not syntactically identical to those of the plurality of questions, and wherein forming the equivalence class mapping further includes:
    constructing a first map of the syntactic representations of the plurality of questions to equivalence set labels and slot indexes of the first map,
    constructing a second map of the syntactic representations of the plurality of passages to sets of the equivalence set labels, and
    constructing a third map of the syntactic representations of the plurality of passages to the equivalence set labels and the slot indexes for each entry of the second map, each entry comprising the given one of the plurality of passages and a given set of the equivalence set labels; and
utilizing the equivalence class mapping to determine an answer to one of the plurality of questions asked of the cognitive question answering system according to matching the one of the plurality of questions to those of the plurality of questions historically asked having the semantically equivalent question focus as identified in the equivalence class mapping.

2. The method of claim 1, wherein, when forming the equivalence class mapping, each of the plurality of questions is mapped to a given set of the plurality of passages according to the syntactic representations.

3. The method of claim 1, wherein for an input query:
the equivalence set labels are identified that fit a given one of the plurality of questions of the input query; and
the given syntactic representation for the given one of the plurality of questions, the identified equivalence set labels of the given one of the plurality of questions, and the slot indexes are added to the first map.

4. The method of claim 3, wherein for the input query:
a given one of the plurality of passages and an initially empty equivalence label set are added to the second map; and
each of the sets of equivalence set labels for the input query from the first map are added into the initially empty equivalence label set in the second map.

5. The method of claim 4, wherein for each entry:
the equivalence set labels are identified that fit a given one of the plurality of passages; wherein only the equivalence set labels within the given set of the equivalence set labels within the given set of the equivalence set label are searched to perform the identification; and
the identified equivalence set labels of the given one of the plurality of passages and the slot indexes are added to the third map.

6. The method of claim 5, further including, for each input query, forming an association between the first, second, and third maps and performing a syntactic grouping operation commensurate with the association to determine the answer to the one of the plurality of questions.

7. The method of claim 1, wherein the mapping comprises a singleton map.

8. A system for processing questions based on equivalence classes in a cognitive question answering system, comprising:
    a processor executing instructions stored in a memory device; wherein the processor:
        provides a plurality of syntactic representations of a plurality of questions asked of the cognitive question answering system;
        provides a plurality of syntactic representations of a plurality of passages ingested by the cognitive question answering system;
        maps question focus to candidate passage pairs to form an equivalence class mapping, wherein, when forming the equivalence class mapping, those of the plurality of questions historically asked of the cognitive question answering system having a semantically equivalent question focus are mapped to semantically equivalent ones of the candidate passage pairs notwithstanding the equivalent ones of the candidate passage pairs are not syntactically identical to those of the plurality of questions, and wherein forming the equivalence class mapping further includes:
            constructing a first map of the syntactic representations of the plurality of questions to equivalence set labels and slot indexes of the first map,
            constructing a second map of the syntactic representations of the plurality of passages to sets of the equivalence set labels, and
            constructing a third map of the syntactic representations of the plurality of passages to the equivalence set labels and the slot indexes for each entry of the second map, each entry comprising the given one of the plurality of passages and a given set of the equivalence set labels; and
        utilizes the equivalence class mapping to determine an answer to one of the plurality of questions asked of the cognitive question answering system according to matching the one of the plurality of questions to those of the plurality of questions historically asked having the semantically equivalent question focus as identified in the equivalence class mapping.

9. The system of claim 8, wherein, when forming the equivalence class mapping, each of the plurality of questions is mapped to a given set of the plurality of passages according to the syntactic representations.

10. The system of claim 8, wherein for an input query:
the equivalence set labels are identified that fit a given one of the plurality of questions of the input query; and
the given syntactic representation for the given one of the plurality of questions, the identified equivalence set labels of the given one of the plurality of questions, and the slot indexes are added to the first map.

11. The system of claim 10, wherein for the input query:
a given one of the plurality of passages and an initially empty equivalence label set are added to the second map; and
each of the sets of equivalence set labels for the input query from the first map are added into the initially empty equivalence label set in the second map.

12. The system of claim 11, wherein for each entry:
the equivalence set labels are identified that fit a given one of the plurality of passages; wherein only the equivalence set labels within the given set of the equivalence set labels within the given set of the equivalence set label are searched to perform the identification; and
the identified equivalence set labels of the given one of the plurality of passages and the slot indexes are added to the third map.

13. The system of claim 12, wherein the processor, for each input query, forms an association between the first, second, and third maps and performs a syntactic grouping operation commensurate with the association to determine the answer to the one of the plurality of questions.

14. The system of claim 8, wherein the mapping comprises a singleton map.

15. A computer program product for processing questions based on equivalence classes in a cognitive question answering system, by a processor, the computer program product embodied on a non-transitory computer-readable storage medium having computer-readable program code portions stored therein, the computer-readable program code portions comprising:

an executable portion that provides a plurality of syntactic representations of a plurality of questions asked of the cognitive question answering system;

an executable portion that provides a plurality of syntactic representations of a plurality of passages ingested by the cognitive question answering system;

an executable portion that maps question focus to candidate passage pairs to form an equivalence class mapping, wherein, when forming the equivalence class mapping, those of the plurality of questions historically asked of the cognitive question answering system having a semantically equivalent question focus are mapped to semantically equivalent ones of the candidate passage pairs notwithstanding the equivalent ones of the candidate passage pairs are not syntactically identical to those of the plurality of questions, and wherein forming the equivalence class mapping further includes:

constructing a first map of the syntactic representations of the plurality of questions to equivalence set labels and slot indexes of the first map, constructing a second map of the syntactic representations of the plurality of passages to sets of the equivalence set labels, and constructing a third map of the syntactic representations of the plurality of passages to the equivalence set labels and the slot indexes for each entry of the second map, each entry comprising the given one of the plurality of passages and a given set of the equivalence set labels; and an executable portion that utilizes the equivalence class mapping to determine an answer to one of the plurality of questions asked of the cognitive question answering system according to matching the one of the plurality of questions to those of the plurality of questions historically asked having the semantically equivalent question focus as identified in the equivalence class mapping.

16. The computer program product of claim 15, wherein, when forming the equivalence class mapping, each of the plurality of questions is mapped to a given set of the plurality of passages according to the syntactic representations.

17. The computer program product of claim 15, wherein for an input query:

the equivalence set labels are identified that fit a given one of the plurality of questions of the input query; and the given syntactic representation for the given one of the plurality of questions, the identified equivalence set labels of the given one of the plurality of questions, and the slot indexes are added to the first map.

18. The computer program product of claim 17, wherein for the input query:

a given one of the plurality of passages and an initially empty equivalence label set are added to the second map; and each of the sets of equivalence set labels for the input query from the first map are added into the initially empty equivalence label set in the second map.

19. The computer program product of claim 18, wherein for each entry:

the equivalence set labels are identified that fit a given one of the plurality of passages; wherein only the equivalence set labels within the given set of the equivalence set labels within the given set of the equivalence set label are searched to perform the identification; and the identified equivalence set labels of the given one of the plurality of passages and the slot indexes are added to the third map.

20. The computer program product of claim 19, further including an executable portion that, for each input query, forms an association between the first, second, and third maps and performs a syntactic grouping operation commensurate with the association to determine the answer to the one of the plurality of questions.

21. The computer program product of claim 15, wherein the mapping comprises a singleton map.

* * * * *